(12) United States Patent
Kumar et al.

(10) Patent No.: US 7,208,910 B1
(45) Date of Patent: Apr. 24, 2007

(54) METHOD FOR MODIFYING BASELINE CIRCUIT ARCHITECTURE FOR A CYCLE-SKIPPING CONTROL SYSTEM INCLUDING COMPUTER READABLE CODE AND CONTROLLER FOR PERFORMING SUCH METHOD

(75) Inventors: Ajith K. Kumar, Erie, PA (US); Bret D. Worden, Union City, PA (US); Emil Nikolaev Nikolov, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/421,203

(22) Filed: May 31, 2006

(51) Int. Cl.
*H02P 23/00* (2006.01)

(52) U.S. Cl. .................. 318/809; 318/727; 318/432; 318/461

(58) Field of Classification Search ............... 318/254, 318/138, 439, 727, 809, 432, 461, 434
See application file for complete search history.

(56) References Cited

U.S. PATENT DOCUMENTS

| | | | |
|---|---|---|---|
| 4,461,985 A | 7/1984 | Stitt | |
| 4,524,316 A | 6/1985 | Brown et al. | |
| 4,791,341 A | 12/1988 | Brown et al. | |
| 5,537,014 A * | 7/1996 | Kettle et al. | 318/375 |
| 5,789,885 A * | 8/1998 | Seel | 318/375 |
| 5,920,162 A * | 7/1999 | Hanson et al. | 318/254 |
| 6,236,177 B1 * | 5/2001 | Zick et al. | 318/362 |

\* cited by examiner

*Primary Examiner*—Rina Duda
(74) *Attorney, Agent, or Firm*—Carlos Hanze; Enrique J. Mora

(57) ABSTRACT

A method, computer-readable code, and controller are provided for configuring a cycle-skipping control system having two or more cycle skippers connected to a common multi-phase AC (alternating current) power source to drive a variable frequency load. One or more circuit architectures (modified relative to a baseline circuit architecture) are provided. The modified circuit architectures enable at least some interconnections not enabled by the baseline circuit architecture when connected between the phases of the power source and the load phases. A respective firing sequence is generated to be applied to a plurality of power switches to the two or more cycle skippers with a modified circuit architecture for implementing a desired mode of operation.

24 Claims, 17 Drawing Sheets

| Firing Window | CS1 | Source/Load | CS2 | Source/Load | CS3 | Source/Load | CS4 | Source/Load |
|---|---|---|---|---|---|---|---|---|
| 1 | XXXXXXX | Vbc | XXXXXXX | Vbc | BBF&CCR | Vbc==>Vbc | XXXXXXX | Vbc |
| 2 | AAF&BBR | Vab==>Vab | XXXXXXX | Vab | XXXXXXX | Vab | XXXXXXX | Vab |
| 3 | AAF&BBR | Vab==>Vab | XXXXXXX | Vab | XXXXXXX | Vab | XXXXXXX | Vab |
| 4 | XXXXXXX | Vca | XXXXXXX | Vca | XXXXXXX | Vca | CCF&AAR | Vca==>Vca |
| 5 | XXXXXXX | Vca | XXXXXXX | Vca | XXXXXXX | Vca | CCF&AAR | Vca==>Vca |
| 6 | XXXXXXX | Vbc | BBF&CCR | Vbc==>Vbc | XXXXXXX | Vbc | XXXXXXX | Vbc |
| 7 | XXXXXXX | Vbc | BBF&CCR | Vbc==>Vbc | XXXXXXX | Vbc | XXXXXXX | Vbc |
| 8 | XXXXXXX | Vab | XXXXXXX | Vab | AAF&BBR | Vab==>Vab | XXXXXXX | Vab |
| 9 | XXXXXXX | Vab | XXXXXXX | Vab | AAF&BBR | Vab==>Vab | XXXXXXX | Vab |
| 10 | CCF&AAR | Vca==>Vca | XXXXXXX | Vca | XXXXXXX | Vca | XXXXXXX | Vca |
| 11 | CCF&AAR | Vca==>Vca | XXXXXXX | Vca | XXXXXXX | Vca | XXXXXXX | Vca |
| 12 | XXXXXXX | Vbc | XXXXXXX | Vbc | XXXXXXX | Vbc | BBF&CCR | Vbc==>Vbc |
| 13 | XXXXXXX | Vbc | XXXXXXX | Vbc | XXXXXXX | Vbc | BBF&CCR | Vbc==>Vbc |
| 14 | XXXXXXX | Vab | AAF&BBR | Vab==>Vab | XXXXXXX | Vab | XXXXXXX | Vab |
| 15 | XXXXXXX | Vab | AAF&BBR | Vab==>Vab | XXXXXXX | Vab | XXXXXXX | Vab |
| 16 | XXXXXXX | Vca | XXXXXXX | Vca | CCF&AAR | Vca==>Vca | XXXXXXX | Vca |
| 17 | XXXXXXX | Vca | XXXXXXX | Vca | CCF&AAR | Vca==>Vca | XXXXXXX | Vca |
| 18 | BBF&CCR | Vbc==>Vbc | XXXXXXX | Vbc | XXXXXXX | Vbc | XXXXXXX | Vbc |
| 19 | BBF&CCR | Vbc==>Vbc | XXXXXXX | Vbc | XXXXXXX | Vbc | XXXXXXX | Vbc |
| 20 | XXXXXXX | Vab | XXXXXXX | Vab | XXXXXXX | Vab | AAF&BBR | Vab==>Vab |
| 21 | XXXXXXX | Vab | XXXXXXX | Vab | XXXXXXX | Vab | AAF&BBR | Vab==>Vab |
| 22 | XXXXXXX | Vca | CCF&AAR | Vca==>Vca | XXXXXXX | Vca | XXXXXXX | Vca |
| 23 | XXXXXXX | Vca | CCF&AAR | Vca==>Vca | XXXXXXX | Vca | XXXXXXX | Vca |
| 24 | XXXXXXX | Vbc | XXXXXXX | Vbc | BBF&CCR | Vbc==>Vbc | XXXXXXX | Vbc |

*FIG. 4*

| Firing Window | CS1 | Source/Load | CS2 | Source/Load | CS3 | Source/Load | CS4 | Source/Load |
|---|---|---|---|---|---|---|---|---|
| 1 | XXXXXXX | Vbc | BBF&CCR | Vbc==>Vbc | XXXXXXX | Vbc | XXXXXXX | Vbc |
| 2 | XXXXXXX | Vab | XXXXXXX | Vab | ACF&BAR | Vab==>Vca | XXXXXXX | Vab |
| 3 | XXXXXXX | Vab | XXXXXXX | Vab | ACF&BAR | Vab==>Vca | XXXXXXX | Vab |
| 4 | CAF&ABR | Vca==>Vab | XXXXXXX | Vca | XXXXXXX | Vca | XXXXXXX | Vca |
| 5 | CAF&ABR | Vca==>Vab | XXXXXXX | Vca | XXXXXXX | Vca | XXXXXXX | Vca |
| 6 | XXXXXXX | Vbc | XXXXXXX | Vbc | XXXXXXX | Vbc | BBF&CCR | Vbc==>Vbc |
| 7 | XXXXXXX | Vbc | XXXXXXX | Vbc | XXXXXXX | Vbc | BBF&CCR | Vbc==>Vbc |
| 8 | XXXXXXX | Vab | ACF&BAR | Vab==>Vca | XXXXXXX | Vab | XXXXXXX | Vab |
| 9 | XXXXXXX | Vab | ACF&BAR | Vab==>Vca | XXXXXXX | Vab | XXXXXXX | Vab |
| 10 | XXXXXXX | Vca | XXXXXXX | Vca | CAF&ABR | Vca==>Vab | XXXXXXX | Vca |
| 11 | XXXXXXX | Vca | XXXXXXX | Vca | CAF&ABR | Vca==>Vab | XXXXXXX | Vca |
| 12 | BBF&CCR | Vbc==>Vbc | XXXXXXX | Vbc | XXXXXXX | Vbc | XXXXXXX | Vbc |
| 13 | BBF&CCR | Vbc==>Vbc | XXXXXXX | Vbc | XXXXXXX | Vbc | XXXXXXX | Vbc |
| 14 | XXXXXXX | Vab | XXXXXXX | Vab | XXXXXXX | Vab | ACF&BAR | Vab==>Vca |
| 15 | XXXXXXX | Vab | XXXXXXX | Vab | XXXXXXX | Vab | ACF&BAR | Vab==>Vca |
| 16 | XXXXXXX | Vca | CAF&ABR | Vca==>Vab | XXXXXXX | Vca | XXXXXXX | Vca |
| 17 | XXXXXXX | Vca | CAF&ABR | Vca==>Vab | XXXXXXX | Vca | XXXXXXX | Vca |
| 18 | XXXXXXX | Vbc | XXXXXXX | Vbc | BBF&CCR | Vbc==>Vbc | XXXXXXX | Vbc |
| 19 | XXXXXXX | Vbc | XXXXXXX | Vbc | BBF&CCR | Vbc==>Vbc | XXXXXXX | Vbc |
| 20 | ACF&BAR | Vab==>Vca | XXXXXXX | Vab | XXXXXXX | Vab | XXXXXXX | Vab |
| 21 | ACF&BAR | Vab==>Vca | XXXXXXX | Vab | XXXXXXX | Vab | XXXXXXX | Vab |
| 22 | XXXXXXX | Vca | XXXXXXX | Vca | XXXXXXX | Vca | CAF&ABR | Vca==>Vab |
| 23 | XXXXXXX | Vca | XXXXXXX | Vca | XXXXXXX | Vca | CAF&ABR | Vca==>Vab |
| 24 | XXXXXXX | Vbc | BBF&CCR | Vbc==>Vbc | XXXXXXX | Vbc | XXXXXXX | Vbc |

FIG. 5

| Firing Window | CS1 | Source/Load | CS2 | Source/Load | CS3 | Source/Load | CS4 | Source/Load |
|---|---|---|---|---|---|---|---|---|
| 1 | AAF&CBR | -Vca==>Vab | XXXXXXX | -Vca | XXXXXXX | -Vca | XXXXXXX | -Vca |
| 2 | AAF&CBR | -Vca==>Vab | XXXXXXX | -Vca | XXXXXXX | -Vca | XXXXXXX | -Vca |
| 3 | XXXXXXX | -Vbc | XXXXXXX | -Vbc | XXXXXXX | -Vbc | CBF&BCR | -Vbc==>Vbc |
| 4 | XXXXXXX | -Vbc | XXXXXXX | -Vbc | XXXXXXX | -Vbc | CBF&BCR | -Vbc==>Vbc |
| 5 | XXXXXXX | -Vab | BCF&AAR | -Vab==>Vca | XXXXXXX | -Vab | XXXXXXX | -Vab |
| 6 | XXXXXXX | -Vab | BCF&AAR | -Vab==>Vca | XXXXXXX | -Vab | XXXXXXX | -Vab |
| 7 | XXXXXXX | -Vca | XXXXXXX | -Vca | AAF&CBR | -Vca==>Vab | XXXXXXX | -Vca |
| 8 | XXXXXXX | -Vca | XXXXXXX | -Vca | AAF&CBR | -Vca==>Vab | XXXXXXX | -Vca |
| 9 | CBF&BCR | -Vbc==>Vbc | XXXXXXX | -Vbc | XXXXXXX | -Vbc | XXXXXXX | -Vbc |
| 10 | CBF&BCR | -Vbc==>Vbc | XXXXXXX | -Vbc | XXXXXXX | -Vbc | XXXXXXX | -Vbc |
| 11 | XXXXXXX | -Vab | XXXXXXX | -Vab | XXXXXXX | -Vab | BCF&AAR | -Vab==>Vca |
| 12 | XXXXXXX | -Vab | XXXXXXX | -Vab | XXXXXXX | -Vab | BCF&AAR | -Vab==>Vca |
| 13 | XXXXXXX | -Vca | AAF&CBR | -Vca==>Vab | XXXXXXX | -Vca | XXXXXXX | -Vca |
| 14 | XXXXXXX | -Vca | AAF&CBR | -Vca==>Vab | XXXXXXX | -Vca | XXXXXXX | -Vca |
| 15 | XXXXXXX | -Vbc | XXXXXXX | -Vbc | CBF&BCR | -Vbc==>Vbc | XXXXXXX | -Vbc |
| 16 | XXXXXXX | -Vbc | XXXXXXX | -Vbc | CBF&BCR | -Vbc==>Vbc | XXXXXXX | -Vbc |
| 17 | BCF&AAR | -Vab==>Vca | XXXXXXX | -Vab | XXXXXXX | -Vab | XXXXXXX | -Vab |
| 18 | BCF&AAR | -Vab==>Vca | XXXXXXX | -Vab | XXXXXXX | -Vab | XXXXXXX | -Vab |
| 19 | XXXXXXX | -Vca | XXXXXXX | -Vca | XXXXXXX | -Vca | AAF&CBR | -Vca==>Vab |
| 20 | XXXXXXX | -Vca | XXXXXXX | -Vca | XXXXXXX | -Vca | AAF&CBR | -Vca==>Vab |
| 21 | XXXXXXX | -Vbc | CBF&BCR | -Vbc==>Vbc | XXXXXXX | -Vbc | XXXXXXX | -Vbc |
| 22 | XXXXXXX | -Vbc | CBF&BCR | -Vbc==>Vbc | XXXXXXX | -Vbc | XXXXXXX | -Vbc |
| 23 | XXXXXXX | -Vab | XXXXXXX | -Vab | BCF&AAR | -Vab==>Vca | XXXXXXX | -Vab |
| 24 | XXXXXXX | -Vab | XXXXXXX | -Vab | BCF&AAR | -Vab==>Vca | XXXXXXX | -Vab |

*FIG. 6*

| Firing Window | CS1 | Source/Load | CS2 | Source/Load |
|---|---|---|---|---|
| 1 | BBF&CCR | Vbc==>Vbc | XXXXXXX | Vbc |
| 2 | XXXXXXX | Vab | ACF&BAR | Vab==>Vca |
| 3 | XXXXXXX | Vab | ACF&BAR | Vab==>Vca |
| 4 | AAF&BBR | Vca==>Vab | XXXXXXX | Vca |
| 5 | AAF&BBR | Vca==>Vab | XXXXXXX | Vca |
| 6 | XXXXXXX | Vbc | BBF&CCR | Vbc==>Vbc |
| 7 | XXXXXXX | Vbc | BBF&CCR | Vbc==>Vbc |
| 8 | ACF&BAR | Vab==>Vca | XXXXXXX | Vab |
| 9 | ACF&BAR | Vab==>Vca | XXXXXXX | Vab |
| 10 | XXXXXXX | Vca | AAF&BBR | Vca==>Vab |
| 11 | XXXXXXX | Vca | AAF&BBR | Vca==>Vab |
| 12 | BBF&CCR | Vbc==>Vbc | XXXXXXX | Vbc |
| 13 | BBF&CCR | Vbc==>Vbc | XXXXXXX | Vbc |
| 14 | XXXXXXX | Vab | ACF&BAR | Vab==>Vca |
| 15 | XXXXXXX | Vab | ACF&BAR | Vab==>Vca |
| 16 | AAF&BBR | Vca==>Vab | XXXXXXX | Vca |
| 17 | AAF&BBR | Vca==>Vab | XXXXXXX | Vca |
| 18 | XXXXXXX | Vbc | BBF&CCR | Vbc==>Vbc |
| 19 | XXXXXXX | Vbc | BBF&CCR | Vbc==>Vbc |
| 20 | ACF&BAR | Vab==>Vca | XXXXXXX | Vab |
| 21 | ACF&BAR | Vab==>Vca | XXXXXXX | Vab |
| 22 | XXXXXXX | Vca | AAF&BBR | Vca==>Vab |
| 23 | XXXXXXX | Vca | AAF&BBR | Vca==>Vab |
| 24 | BBF&CCR | Vbc==>Vbc | XXXXXXX | Vbc |

*FIG. 7*

| Firing Window | CS1 | Source/Load | CS2 | Source/Load |
|---|---|---|---|---|
| 1 | XXXXXXX | Vbc | BBF&CCR | Vbc==>Vbc |
| 2 | AAF&BBR | Vab==>Vab | XXXXXXX | Vab |
| 3 | AAF&BBR | Vab==>Vab | XXXXXXX | Vab |
| 4 | XXXXXXX | Vca | CCF&AAR | Vca==>Vca |
| 5 | XXXXXXX | Vca | CCF&AAR | Vca==>Vca |
| 6 | BBF&CCR | Vbc==>Vbc | XXXXXXX | Vbc |
| 7 | BBF&CCR | Vbc==>Vbc | XXXXXXX | Vbc |
| 8 | XXXXXXX | Vab | AAF&BBR | Vab==>Vab |
| 9 | XXXXXXX | Vab | AAF&BBR | Vab==>Vab |
| 10 | CCF&AAR | Vca==>Vca | XXXXXXX | Vca |
| 11 | CCF&AAR | Vca==>Vca | XXXXXXX | Vca |
| 12 | XXXXXXX | Vbc | BBF&CCR | Vbc==>Vbc |
| 13 | XXXXXXX | Vbc | BBF&CCR | Vbc==>Vbc |
| 14 | AAF&BBR | Vab==>Vab | XXXXXXX | Vab |
| 15 | AAF&BBR | Vab==>Vab | XXXXXXX | Vab |
| 16 | XXXXXXX | Vca | CCF&AAR | Vca==>Vca |
| 17 | XXXXXXX | Vca | CCF&AAR | Vca==>Vca |
| 18 | BBF&CCR | Vbc==>Vbc | | Vbc |
| 19 | BBF&CCR | Vbc==>Vbc | | Vbc |
| 20 | XXXXXXX | Vab | AAF&BBR | Vab==>Vab |
| 21 | XXXXXXX | Vab | AAF&BBR | Vab==>Vab |
| 22 | CCF&AAR | Vca==>Vca | XXXXXXX | Vca |
| 23 | CCF&AAR | Vca==>Vca | XXXXXXX | Vca |
| 24 | XXXXXXX | Vbc | BBF&CCR | Vbc==>Vbc |

*FIG. 8*

| Firing Window | CS1 | Source/Load | CS2 | Source/Load | CS3 | Source/Load | CS4 | Source/Load |
|---|---|---|---|---|---|---|---|---|
| 1 | XXXXXXX | Vbc | BCF&CAR | Vbc==>Vca | XXXXXXX | Vbc | XXXXXXX | Vbc |
| 2 | XXXXXXX | Vab | XXXXXXX | Vab | ABF&BCR | Vab==>Vbc | XXXXXXX | Vab |
| 3 | XXXXXXX | Vab | XXXXXXX | Vab | ABF&BCR | Vab==>Vbc | XXXXXXX | Vab |
| 4 | CAF&ABR | Vca==>Vab | XXXXXXX | Vca | XXXXXXX | Vca | XXXXXXX | Vca |
| 5 | CAF&ABR | Vca==>Vab | XXXXXXX | Vca | XXXXXXX | Vca | XXXXXXX | Vca |
| 6 | XXXXXXX | Vbc | XXXXXXX | Vbc | XXXXXXX | Vbc | BCF&CAR | Vbc==>Vca |
| 7 | XXXXXXX | Vbc | XXXXXXX | Vbc | XXXXXXX | Vbc | BCF&CAR | Vbc==>Vca |
| 8 | XXXXXXX | Vab | ABF&BCR | Vab==>Vbc | XXXXXXX | Vab | XXXXXXX | Vab |
| 9 | XXXXXXX | Vab | ABF&BCR | Vab==>Vbc | XXXXXXX | Vab | XXXXXXX | Vab |
| 10 | XXXXXXX | Vca | XXXXXXX | Vca | CAF&ABR | Vca==>Vab | XXXXXXX | Vca |
| 11 | XXXXXXX | Vca | XXXXXXX | Vca | CAF&ABR | Vca==>Vab | XXXXXXX | Vca |
| 12 | BCF&CAR | Vbc==>Vca | XXXXXXX | Vbc | XXXXXXX | Vbc | XXXXXXX | Vbc |
| 13 | BCF&CAR | Vbc==>Vca | XXXXXXX | Vbc | XXXXXXX | Vbc | XXXXXXX | Vbc |
| 14 | XXXXXXX | Vab | XXXXXXX | Vab | XXXXXXX | Vab | ABF&BCR | Vab==>Vbc |
| 15 | XXXXXXX | Vab | XXXXXXX | Vab | XXXXXXX | Vab | ABF&BCR | Vab==>Vbc |
| 16 | XXXXXXX | Vca | CAF&ABR | Vca==>Vab | XXXXXXX | Vca | XXXXXXX | Vca |
| 17 | XXXXXXX | Vca | CAF&ABR | Vca==>Vab | XXXXXXX | Vca | XXXXXXX | Vca |
| 18 | XXXXXXX | Vbc | XXXXXXX | Vbc | BCF&CAR | Vbc==>Vca | XXXXXXX | Vbc |
| 19 | XXXXXXX | Vbc | XXXXXXX | Vbc | BCF&CAR | Vbc==>Vca | XXXXXXX | Vbc |
| 20 | ABF&BCR | Vab==>Vbc | XXXXXXX | Vab | XXXXXXX | Vab | XXXXXXX | Vab |
| 21 | ABF&BCR | Vab==>Vbc | XXXXXXX | Vab | XXXXXXX | Vab | XXXXXXX | Vab |
| 22 | XXXXXXX | Vca | XXXXXXX | Vca | XXXXXXX | Vca | CAF&ABR | Vca==>Vab |
| 23 | XXXXXXX | Vca | XXXXXXX | Vca | XXXXXXX | Vca | CAF&ABR | Vca==>Vab |
| 24 | XXXXXXX | Vbc | BCF&CAR | Vbc==>Vca | XXXXXXX | Vbc | XXXXXXX | Vbc |

FIG. 10

| Firing Window | CS1 | Source/Load | CS2 | Source/Load | CS3 | Source/Load | CS4 | Source/Load |
|---|---|---|---|---|---|---|---|---|
| 1 | XXXXXXX | Vbc | XXXXXXX | Vbc | BCF&CAR | Vbc==>Vca | XXXXXXX | Vbc |
| 2 | AAF&BBR | Vab==>Van | XXXXXXX | Vab | XXXXXXX | Vab | XXXXXXX | Vab |
| 3 | AAF&BBR | Vab==>Van | XXXXXXX | Vab | XXXXXXX | Vab | XXXXXXX | Vab |
| 4 | XXXXXXX | Vca | XXXXXXX | Vca | XXXXXXX | Vca | XXXXXXX | Vca |
| 5 | XXXXXXX | Vca | XXXXXXX | Vca | XXXXXXX | Vca | CBF&ACR | Vca==>Vbc |
| 6 | XXXXXXX | Vbc | BCF&CAR | Vbc==>Vca | XXXXXXX | Vbc | CBF&ACR | Vca==>Vbc |
| 7 | XXXXXXX | Vbc | BCF&CAR | Vbc==>Vca | XXXXXXX | Vbc | XXXXXXX | Vbc |
| 8 | XXXXXXX | Vab | XXXXXXX | Vab | AAF&BBR | Vab==>Van | XXXXXXX | Vab |
| 9 | XXXXXXX | Vab | XXXXXXX | Vab | AAF&BBR | Vab==>Van | XXXXXXX | Vab |
| 10 | CBF&ACR | Vca==>Vbc | XXXXXXX | Vca | XXXXXXX | Vca | XXXXXXX | Vca |
| 11 | CBF&ACR | Vca==>Vbc | XXXXXXX | Vca | XXXXXXX | Vca | XXXXXXX | Vca |
| 12 | XXXXXXX | Vbc | XXXXXXX | Vbc | XXXXXXX | Vbc | BCF&CAR | Vbc==>Vca |
| 13 | XXXXXXX | Vbc | XXXXXXX | Vbc | XXXXXXX | Vbc | BCF&CAR | Vbc==>Vca |
| 14 | XXXXXXX | Vab | AAF&BBR | Vab==>Van | XXXXXXX | Vab | XXXXXXX | Vab |
| 15 | XXXXXXX | Vab | AAF&BBR | Vab==>Van | XXXXXXX | Vab | XXXXXXX | Vab |
| 16 | XXXXXXX | Vca | XXXXXXX | Vca | CBF&ACR | Vca==>Vbc | XXXXXXX | Vca |
| 17 | XXXXXXX | Vca | XXXXXXX | Vca | CBF&ACR | Vca==>Vbc | XXXXXXX | Vca |
| 18 | BCF&CAR | Vbc==>Vca | XXXXXXX | Vbc | XXXXXXX | Vbc | XXXXXXX | Vbc |
| 19 | BCF&CAR | Vbc==>Vca | XXXXXXX | Vbc | XXXXXXX | Vbc | XXXXXXX | Vbc |
| 20 | XXXXXXX | Vab | XXXXXXX | Vab | XXXXXXX | Vab | AAF&BBR | Vab==>Van |
| 21 | XXXXXXX | Vab | XXXXXXX | Vab | XXXXXXX | Vab | AAF&BBR | Vab==>Van |
| 22 | XXXXXXX | Vca | CBF&ACR | Vca==>Vbc | XXXXXXX | Vca | XXXXXXX | Vca |
| 23 | XXXXXXX | Vca | CBF&ACR | Vca==>Vbc | XXXXXXX | Vca | XXXXXXX | Vca |
| 24 | XXXXXXX | Vbc | XXXXXXX | Vbc | BCF&CAR | Vbc==>Vca | XXXXXXX | Vbc |

*FIG. 11*

| Firing Window | CS1 | Source/Load | CS2 | Source/Load | CS3 | Source/Load | CS4 | Source/Load |
|---|---|---|---|---|---|---|---|---|
| 1 | AAF&CBR | -Vca==>Vab | XXXXXXX | -Vca | XXXXXXX | -Vca | XXXXXXX | -Vca |
| 2 | AAF&CBR | -Vca==>Vab | XXXXXXX | -Vca | XXXXXXX | -Vca | XXXXXXX | -Vca |
| 3 | XXXXXXX | -Vbc | XXXXXXX | -Vbc | XXXXXXX | -Vbc | CCF&BAR | -Vbc==>Vca |
| 4 | XXXXXXX | -Vbc | XXXXXXX | -Vbc | XXXXXXX | -Vbc | CCF&BAR | -Vbc==>Vca |
| 5 | XXXXXXX | -Vab | BBF&ACR | -Vab==>Vbc | XXXXXXX | -Vab | XXXXXXX | -Vab |
| 6 | XXXXXXX | -Vab | BBF&ACR | -Vab==>Vbc | XXXXXXX | -Vab | XXXXXXX | -Vab |
| 7 | XXXXXXX | -Vca | XXXXXXX | -Vca | AAF&CBR | -Vca==>Vab | XXXXXXX | -Vca |
| 8 | XXXXXXX | -Vca | XXXXXXX | -Vca | AAF&CBR | -Vca==>Vab | XXXXXXX | -Vca |
| 9 | CCF&BAR | -Vbc==>Vca | XXXXXXX | -Vbc | XXXXXXX | -Vbc | XXXXXXX | -Vbc |
| 10 | CCF&BAR | -Vbc==>Vca | XXXXXXX | -Vbc | XXXXXXX | -Vbc | XXXXXXX | -Vbc |
| 11 | XXXXXXX | -Vab | XXXXXXX | -Vab | XXXXXXX | -Vab | BBF&ACR | -Vab==>Vbc |
| 12 | XXXXXXX | -Vab | XXXXXXX | -Vab | XXXXXXX | -Vab | BBF&ACR | -Vab==>Vbc |
| 13 | XXXXXXX | -Vca | AAF&CBR | -Vca==>Vab | XXXXXXX | -Vca | XXXXXXX | -Vca |
| 14 | XXXXXXX | -Vca | AAF&CBR | -Vca==>Vab | XXXXXXX | -Vca | XXXXXXX | -Vca |
| 15 | XXXXXXX | -Vbc | XXXXXXX | -Vbc | CCF&BAR | -Vbc==>Vca | XXXXXXX | -Vbc |
| 16 | XXXXXXX | -Vbc | XXXXXXX | -Vbc | CCF&BAR | -Vbc==>Vca | XXXXXXX | -Vbc |
| 17 | BBF&ACR | -Vab==>Vbc | XXXXXXX | -Vab | XXXXXXX | -Vab | XXXXXXX | -Vab |
| 18 | BBF&ACR | -Vab==>Vbc | XXXXXXX | -Vab | XXXXXXX | -Vab | XXXXXXX | -Vab |
| 19 | XXXXXXX | -Vca | XXXXXXX | -Vca | XXXXXXX | -Vca | AAF&CBR | -Vca==>Vab |
| 20 | XXXXXXX | -Vca | XXXXXXX | -Vca | XXXXXXX | -Vca | AAF&CBR | -Vca==>Vab |
| 21 | XXXXXXX | -Vbc | CCF&BAR | -Vbc==>Vca | XXXXXXX | -Vbc | XXXXXXX | -Vbc |
| 22 | XXXXXXX | -Vbc | CCF&BAR | -Vbc==>Vca | XXXXXXX | -Vbc | XXXXXXX | -Vbc |
| 23 | XXXXXXX | -Vab | XXXXXXX | -Vab | BBF&ACR | -Vab==>Vbc | XXXXXXX | -Vab |
| 24 | XXXXXXX | -Vab | XXXXXXX | -Vab | BBF&ACR | -Vab==>Vbc | XXXXXXX | -Vab |

FIG. 12

| Firing Window | CS1 | Source/Load | CS2 | Source/Load |
|---|---|---|---|---|
| 1 | AAF&CBR | −Vca==>Vab | XXXXXXX | −Vca |
| 2 | AAF&CBR | −Vca==>Vab | XXXXXXX | −Vca |
| 3 | XXXXXXX | −Vbc | CCF&BAR | −Vbc==>Vca |
| 4 | XXXXXXX | −Vbc | CCF&BAR | −Vbc==>Vca |
| 5 | BBF&ACR | −Vab==>Vbc | XXXXXXX | −Vab |
| 6 | BBF&ACR | −Vab==>Vbc | XXXXXXX | −Vab |
| 7 | XXXXXXX | −Vca | AAF&CBR | −Vca==>Vab |
| 8 | XXXXXXX | −Vca | AAF&CBR | −Vca==>Vab |
| 9 | CCF&BAR | −Vbc==>Vca | XXXXXXX | −Vbc |
| 10 | CCF&BAR | −Vbc==>Vca | XXXXXXX | −Vbc |
| 11 | XXXXXXX | −Vab | BBF&ACR | −Vab==>Vbc |
| 12 | XXXXXXX | −Vab | BBF&ACR | −Vab==>Vbc |
| 13 | AAF&CBR | −Vca==>Vab | XXXXXXX | −Vca |
| 14 | AAF&CBR | −Vca==>Vab | XXXXXXX | −Vca |
| 15 | XXXXXXX | −Vbc | CCF&BAR | −Vbc==>Vca |
| 16 | XXXXXXX | −Vbc | CCF&BAR | −Vbc==>Vca |
| 17 | BBF&ACR | −Vab==>Vbc | XXXXXXX | −Vab |
| 18 | BBF&ACR | −Vab==>Vbc | XXXXXXX | −Vab |
| 19 | XXXXXXX | −Vca | AAF&CBR | −Vca==>Vab |
| 20 | XXXXXXX | −Vca | AAF&CBR | −Vca==>Vab |
| 21 | CCF&BAR | −Vbc==>Vca | XXXXXXX | −Vbc |
| 22 | CCF&BAR | −Vbc==>Vca | XXXXXXX | −Vbc |
| 23 | | −Vab | BBF&ACR | −Vab==>Vbc |
| 24 | | −Vab | BBF&ACR | −Vab==>Vbc |

*FIG. 13*

| Firing Window | CS1 | Source/Load | CS2 | Source/Load |
|---|---|---|---|---|
| 1 | XXXXXXX | Vbc | BCF&CAR | Vbc==>Vca |
| 2 | AAF&BBR | Vab==>Vab | XXXXXXX | Vab |
| 3 | AAF&BBR | Vab==>Vab | XXXXXXX | Vab |
| 4 | XXXXXXX | Vca | CBF&ACR | Vca==>Vbc |
| 5 | XXXXXXX | Vca | CBF&ACR | Vca==>Vbc |
| 6 | BCF&CAR | Vbc==>Vca | XXXXXXX | Vbc |
| 7 | BCF&CAR | Vbc==>Vca | XXXXXXX | Vbc |
| 8 | XXXXXXX | Vab | AAF&BBR | Vab==>Vab |
| 9 | XXXXXXX | Vab | AAF&BBR | Vab==>Vab |
| 10 | CBF&ACR | Vca==>Vbc | XXXXXXX | Vca |
| 11 | CBF&ACR | Vca==>Vbc | XXXXXXX | Vca |
| 12 | XXXXXXX | Vbc | BCF&CAR | Vbc==>Vca |
| 13 | XXXXXXX | Vbc | BCF&CAR | Vbc==>Vca |
| 14 | AAF&BBR | Vab==>Vab | XXXXXXX | Vab |
| 15 | AAF&BBR | Vab==>Vab | XXXXXXX | Vab |
| 16 | XXXXXXX | Vca | CBF&ACR | Vca==>Vbc |
| 17 | XXXXXXX | Vca | CBF&ACR | Vca==>Vbc |
| 18 | BCF&CAR | Vbc==>Vca | XXXXXXX | Vbc |
| 19 | BCF&CAR | Vbc==>Vca | XXXXXXX | Vbc |
| 20 | XXXXXXX | Vab | AAF&BBR | Vab==>Vab |
| 21 | XXXXXXX | Vab | AAF&BBR | Vab==>Vab |
| 22 | CBF&ACR | Vca==>Vbc | XXXXXXX | Vca |
| 23 | CBF&ACR | Vca==>Vbc | XXXXXXX | Vca |
| 24 | XXXXXXX | Vbc | BCF&CAR | Vbc==>Vca |

*FIG. 14*

| Firing Window | CS1 | Source/Load | CS2 | Source/Load | CS3 | Source/Load | CS4 | Source/Load |
|---|---|---|---|---|---|---|---|---|
| 1 | XXXXXXX | Vbc | XXXXXXX | Vbc | XXXXXXX | Vbc | BAF&CBR | Vbc==>Vab |
| 2 | XXXXXXX | Vab | ABF&BCR | Vab==>Vbc | XXXXXXX | Vab | XXXXXXX | Vab |
| 3 | XXXXXXX | Vab | ABF&BCR | Vab==>Vbc | XXXXXXX | Vab | XXXXXXX | Vab |
| 4 | XXXXXXX | Vca | XXXXXXX | Vca | CCF&AAR | Vca==>Vca | XXXXXXX | Vca |
| 5 | XXXXXXX | Vca | XXXXXXX | Vca | CCF&AAR | Vca==>Vca | XXXXXXX | Vca |
| 6 | BAF&CBR | Vbc==>Vab | XXXXXXX | Vbc | XXXXXXX | Vbc | XXXXXXX | Vbc |
| 7 | BAF&CBR | Vbc==>Vab | XXXXXXX | Vbc | XXXXXXX | Vbc | XXXXXXX | Vbc |
| 8 | XXXXXXX | Vab | XXXXXXX | Vab | XXXXXXX | Vab | ABF&BCR | Vab==>Vbc |
| 9 | XXXXXXX | Vab | XXXXXXX | Vab | XXXXXXX | Vab | ABF&BCR | Vab==>Vbc |
| 10 | XXXXXXX | Vca | CCF&AAR | Vca==>Vca | XXXXXXX | Vca | XXXXXXX | Vca |
| 11 | XXXXXXX | Vca | CCF&AAR | Vca==>Vca | XXXXXXX | Vca | XXXXXXX | Vca |
| 12 | XXXXXXX | Vbc | XXXXXXX | Vbc | BAF&CBR | Vbc==>Vab | XXXXXXX | Vbc |
| 13 | XXXXXXX | Vbc | XXXXXXX | Vbc | BAF&CBR | Vbc==>Vab | XXXXXXX | Vbc |
| 14 | ABF&BCR | Vab==>Vbc | XXXXXXX | Vab | XXXXXXX | Vab | XXXXXXX | Vab |
| 15 | ABF&BCR | Vab==>Vbc | XXXXXXX | Vab | XXXXXXX | Vab | XXXXXXX | Vab |
| 16 | XXXXXXX | Vca | XXXXXXX | Vca | XXXXXXX | Vca | CCF&AAR | Vca==>Vca |
| 17 | XXXXXXX | Vca | XXXXXXX | Vca | XXXXXXX | Vca | CCF&AAR | Vca==>Vca |
| 18 | XXXXXXX | Vbc | BAF&CBR | Vbc==>Vab | XXXXXXX | Vbc | XXXXXXX | Vbc |
| 19 | XXXXXXX | Vbc | BAF&CBR | Vbc==>Vab | XXXXXXX | Vbc | XXXXXXX | Vbc |
| 20 | XXXXXXX | Vab | XXXXXXX | Vab | ABF&BCR | Vab==>Vbc | XXXXXXX | Vab |
| 21 | XXXXXXX | Vab | XXXXXXX | Vab | ABF&BCR | Vab==>Vbc | XXXXXXX | Vab |
| 22 | CCF&AAR | Vca==>Vca | XXXXXXX | Vca | XXXXXXX | Vca | XXXXXXX | Vca |
| 23 | CCF&AAR | Vca==>Vca | XXXXXXX | Vca | XXXXXXX | Vca | XXXXXXX | Vca |
| 24 | XXXXXXX | Vbc | XXXXXXX | Vbc | XXXXXXX | Vbc | BAF&CBR | Vbc==>Vab |

*FIG. 16*

| Firing Window | CS1 | Source/Load | CS2 | Source/Load |
|---|---|---|---|---|
| 1 | BBF&CCR | Vbc==>Vbc | BCF&CBR | −Vbc==>Vbc |
| 2 | XXXXXXX | | XXXXXXX | |
| 3 | AAF&BCR | −Vab==>Vca | ACF&BAR | Vab==>Vca |
| 4 | XXXXXXX | | XXXXXXX | |
| 5 | CAF&ABR | Vca==>Vab | CBF&AAR | −Vca==>Vab |
| 6 | XXXXXXX | | XXXXXXX | |
| 7 | BCF&CBR | −Vbc==>Vbc | BBF&CCR | Vbc==>Vbc |
| 8 | XXXXXXX | | XXXXXXX | |
| 9 | ACF&BAR | Vab==>Vca | AAF&BCR | −Vab==>Vca |
| 10 | XXXXXXX | | XXXXXXX | |
| 11 | CBF&AAR | −Vca==>Vab | CAF&ABR | Vca==>Vab |
| 12 | XXXXXXX | | XXXXXXX | |
| 13 | BBF&CCR | Vbc==>Vbc | BCF&CBR | −Vbc==>Vbc |
| 14 | XXXXXXX | | XXXXXXX | |
| 15 | AAF&BCR | −Vab==>Vca | ACF&BAR | Vab==>Vca |
| 16 | XXXXXXX | | XXXXXXX | |
| 17 | CAF&ABR | Vca==>Vab | CBF&AAR | −Vca==>Vab |
| 18 | XXXXXXX | | XXXXXXX | |
| 19 | BCF&CBR | −Vbc==>Vbc | BBF&CCR | Vbc==>Vbc |
| 20 | XXXXXXX | | XXXXXXX | |
| 21 | ACF&BAR | Vab==>Vca | AAF&BCR | −Vab==>Vca |
| 22 | XXXXXXX | | XXXXXXX | |
| 23 | CBF&AAR | −Vca==>Vab | CAF&ABR | Vca==>Vab |
| 24 | XXXXXXX | | XXXXXXX | |

FIG. 17

METHOD FOR MODIFYING BASELINE CIRCUIT ARCHITECTURE FOR A CYCLE-SKIPPING CONTROL SYSTEM INCLUDING COMPUTER READABLE CODE AND CONTROLLER FOR PERFORMING SUCH METHOD

RELATED APPLICATIONS

This application is related to concurrently filed application Ser. No. 11/421,193, filed May 31, 2006, titled "A Method for Controlling a Cycle-Skipping Control System Including Computer Readable Code and Controller for Performing Such Method", assigned to the same assignee of the present invention and incorporated herein by reference in its entirety.

FIELD OF THE INVENTION

The present invention is generally related to drive systems for variable frequency alternating current (ac) electromotive machines, and, more particularly, to a motor speed control system based on "cycle-skipping" techniques.

Aspects of the present invention provide improvements to a cycle-skipping motor speed control system, such as disclosed in U.S. Pats. No. 4,461,985; 4,524,316 and 4,791,341, each assigned to General Electric Company (the same assignee of the present invention), and each expressly incorporated herein by reference in their entirety.

According to the disclosure of the referenced patents, a variable speed 3-phase ac motor may be connected to a 3-phase source of alternating voltage via a plurality of controllable solid state power switches, such as solid state controlled rectifiers (SCRs) (e.g., thyristors). The respective switches are so arranged and controlled to produce a voltage/current output at a desired frequency and/or magnitude, such that the motor speed can be reduced. This is achieved skipping selected cycles of the input source voltage to produce the desired output. Consequently, the fundamental frequency of the source voltage becomes a multiple (e.g., 2×, 3×, 4×) of the fundamental frequency (f) of the output voltage and the running speed of the motor will be correspondingly reduced compared to full speed.

Systems, such as disclosed in the referenced patents, have operated quite successfully in various practical applications, such as locomotive applications. Nevertheless, when two or more cycle skippers are connected to a common source to drive multiple loads and the firing patterns for such cycle skippers are temporally aligned (e.g., concurrent firings), the source current waveforms of this cycle-skipping system tend to develop harmonic components of relatively high amplitude that can introduce undesirable effects, such as vibration, noise and heating effects. Accordingly, it would be desirable to provide a system and/or control techniques that allow operation of a cycle-skipping system comprising two or more cycle skippers connected to a common source to drive multiple loads, wherein the firing patterns and/or circuit architecture are arranged to better distribute per/phase current flow over the firing cycle of the two or more cycle skippers so as to reduce the magnitude of such harmonic components and thereby reduce any concomitant undesirable effects.

BRIEF DESCRIPTION OF THE DRAWINGS

These and other advantages of the invention will be more apparent from the following description in view of the drawings that show:

FIGS. 4–6 indicate exemplary families of firing signals for a number of multiple cycle skippers, as the one cycle skipper shown in FIG. 2, configured to provide ¼ speed operation, for the example case of CBA input phase rotation and CBA output phase rotation.

FIGS. 7–8 indicate exemplary families of firing signals for a number of multiple cycle skippers, as the one cycle skipper shown in FIG. 2, configured to provide ½ speed single pulse operation, for the example case of CBA input phase rotation and CBA output phase rotation.

FIGS. 10–14 indicate exemplary families of firing signals for a number of multiple cycle skippers, as the one cycle skipper shown in FIG. 9, under various operational conditions.

FIGS. 16–17 indicate exemplary families of firing signals for a number of multiple cycle skippers, as the one cycle skipper shown in FIG. 15, under various operational conditions.

DETAILED DESCRIPTION OF THE INVENTION

Figure 1:
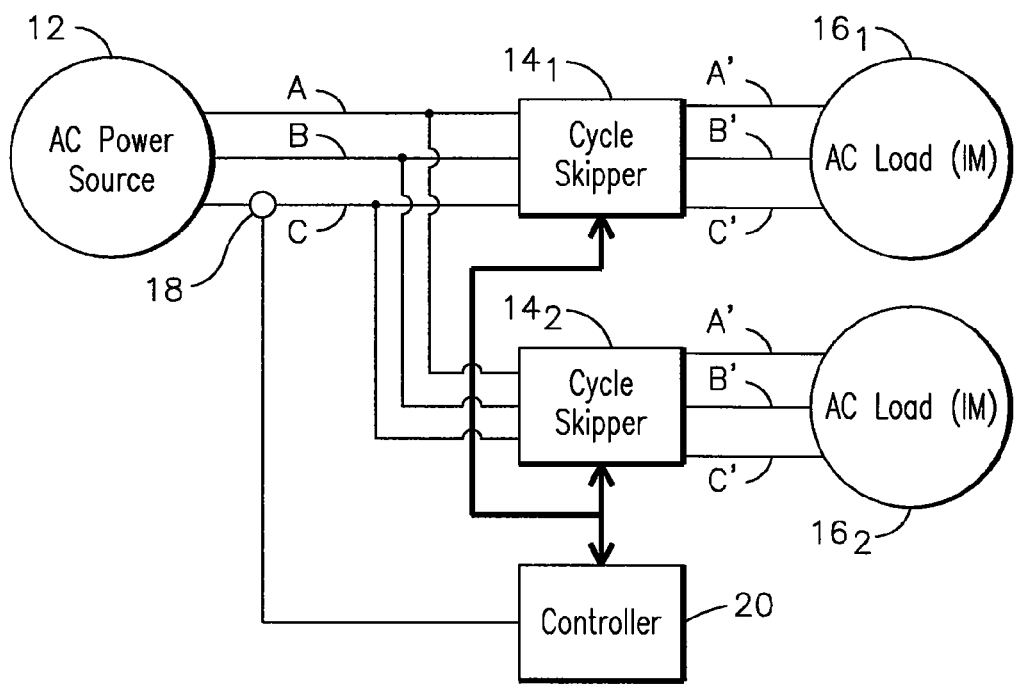
FIG. 1 is a schematic of an exemplary drive system comprising two or more cycle skippers connected to a common power source to drive two or more variable speed induction motors.

The drive system shown in FIG. 1 in one example embodiment comprises a 3-phase power source 12, such as an ac generator (sometimes referred to as an "alternator") which serves as a source of alternating voltage to be applied by way of two or more cycle skippers, such as cycle skippers 14₁ and 14₂, to two or more variable frequency 3-phase ac loads 16₁, and 16₂, such as induction motors. The fundamental frequency of the voltage at the output of the generator 12 (i.e., the frequency of the fundamental sinusoidal component of the generator's output voltage waveform) is "f" Hertz, and the rms magnitude of this voltage is "v" volts. The magnitude of f depends on the angular velocity (rpm) at which the generator rotor is driven by a prime mover (not shown) mechanically coupled to the rotor of the generator.

In one exemplary application, each motor 16 may be used to drive an impeller or the blades of a blower or fan that may be part of an air cooling system of a self-propelled traction vehicle, such as a diesel-electric locomotive. In this exemplary application, the prime mover may be a variable speed diesel engine. Accordingly, both the frequency and the magnitude of the alternating voltage output of the generator 12 may vary. By way of example, in one exemplary embodiment, f can vary in a 4-to-1 range between 26 and 105 Hz, and v will correspondingly vary, with f, in a range between 100 and 402 volts rms. In one exemplary embodiment the generated voltage has a generally sinusoidal waveform.

The inventors of the present invention have innovatively recognized control techniques and/or circuit architecture that will allow operation of a cycle-skipping system comprising two or more cycle skippers connected to a common source to drive multiple loads while reducing the magnitude of such harmonic components and thereby reducing concomitant undesirable effects, such as noise and heating effects. The description below will now proceed to discuss control techniques designed so that the firing patterns for such multiple cycle skippers are temporally shifted (e.g., non-concurrent firings over a firing cycle). This shifting may be conceptualized as a phase angle shift between the firing patterns applied to the multiple cycle-skippers and enables to advantageously reduce the magnitude of harmonic components that may develop at the source currents.

The first, second, and third phases of the 3-phase windings of generator 12 are so arranged to respectively energize three power input terminals A, B, and C of a cycle-skipping speed control system embodying aspects of the present invention. The output terminals of the system are designated A", B" and C", and they in turn are respectively adapted to be connected to the corresponding phases of the armature windings of the motors 16, such as via suitable sensors 18 (e.g., current and/or voltage sensor) that provide feedback signals. For the sake of simplicity of illustration, it is noted that just one sensor is shown in FIG. 1. It will be appreciated, however, that each of the phases may include such sensors.

Figure 2:
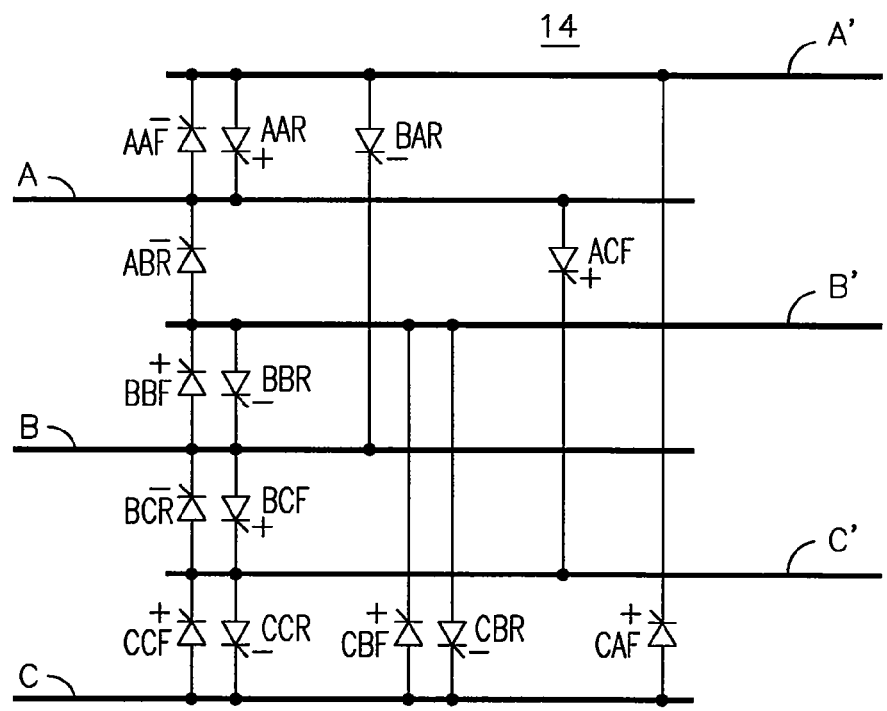
FIG. 2 illustrates one example baseline circuit architecture for one cycle skipper.

As indicated in FIG. 2, the input and output terminals of the speed control system are interconnected by means of a plurality of controllable power switches, such as silicon controlled rectifiers (SCRs). In the illustrated embodiment of the invention, the switches include a first switch pair (AAF and AAR) connected between the first input A and output terminal A", a second switch pair (BBF and BBR) connected between the second input B and output terminal B", a third switch pair (CCF and CCR) connected between the third input C and output terminal C", a fourth switch pair (CBF and CBR) connected between the third input terminal C and the second output terminal B', a fifth switch pair (BCR and BCF) connected between the second input terminal B and the third output terminal C'. As shown in FIG. 2, the foregoing switch pairs are arranged in inverse-parallel relationship.

As further shown in FIG. 2, a switch ABR is connected between the first input terminal A and the second output terminal B', a switch ACF is connected between the same input terminal A and the third output terminal C', switches BAR and CAF are connected between the first output terminal A' and the second and third input terminals B and C, respectively. It will now be apparent that the first three switch pairs connect the three source phases to the corresponding motor phases, whereas the fourth and fifth switch pairs are arranged to cross-connect the second and third phases of the source and of the motor, respectively. The switches ABR and ACF are arranged to connect the first source phase to the second and third motor phases, respectively, and the switches BAR and CAF interconnect the first motor phase to the second and third source phases, respectively.

As can be seen in FIG. 2, in each switch a plus symbol "+" is associated with the gate or control electrode of a switch that may be commanded to conduct positive motor current, (e.g. current flow to the motor) and a minus symbol "−" is associated with the gate or control electrode of the switch that may be commanded to conduct negative motor current (e.g. current flow from the motor).

If, for example, thyristors are used, to turn on an individual thyristor, an appropriate signal is applied to the associated gate while the main electrodes of that thyristor are forward biased (i.e., anode potential is positive with respect to cathode). Such a signal is sometimes called a trigger or gating signal, and it is herein referred to generically as a "firing signal." Subsequently, due to the periodic reversal of the source voltage polarity, the main electrodes will become reverse biased whereupon the thyristor automatically turns off (i.e., it reverts to its high-resistance, non-conducting, open circuit state) by an "a-c line commutation" process.

The firing signals for the controllable switches are supplied by the cycle-skippers, such as cycle skippers $14_1$ and $14_2$ (FIG. 1). In a manner that will be explained below, the cycle-skippers may be configured to cyclically produce, in synchronism with the source voltage, alternative families of periodic firing signals configured to reduce the magnitude of the harmonic components. It will be appreciated that the particular number, combination and pattern of the firing signals in a family may also be influenced by factors such as: what fraction 1/N of full speed is desired (N being a predetermined integer such as 2 or 4); whether a forward or reverse motor direction is commanded; whether a positive portion or a negative portion of the input source is used; whether variations exist between the circuit architecture of the cycle skippers, in the event of ½ speed, whether single-pulse or double-pulse cycle-skipping is performed, etc.

Figure 3:
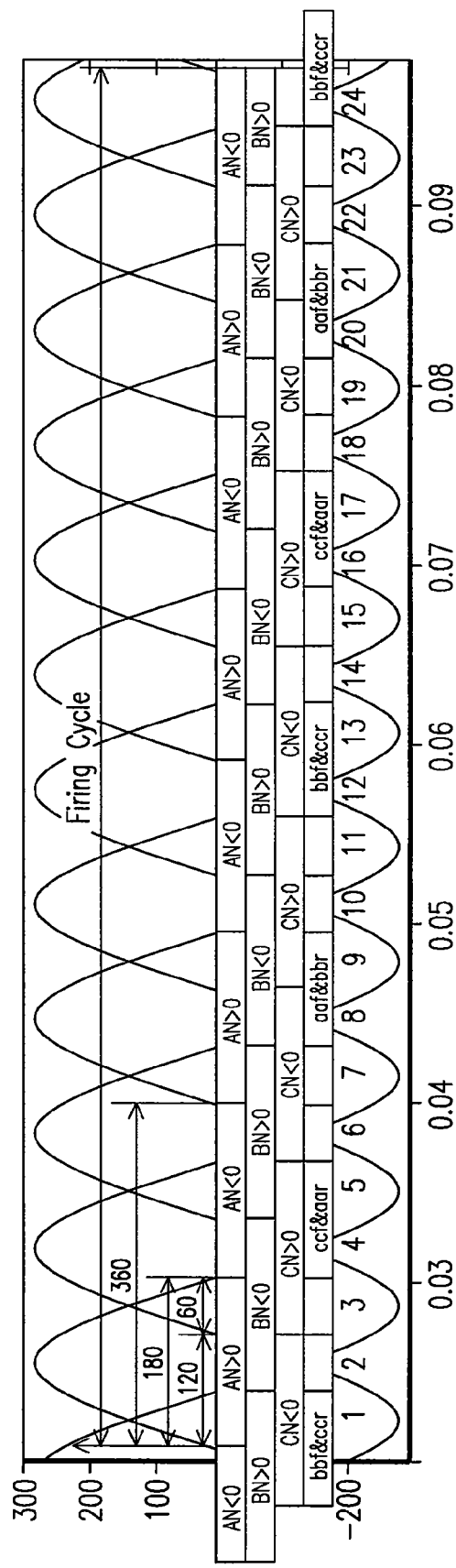
FIG. 3 is a plot of firing windows with respect to the line source voltage for two cycle skippers configured to provide quarter cycle speed operation and forward rotation for the motor, wherein each cycle skipper comprises the circuit architecture of FIG. 2.

FIG. 3 is a plot of firing windows with respect to the line source voltage and the power switches as arranged in FIG. 2 for two cycle skippers configured to provide quarter cycle speed operation and forward rotation for the motor. As seen in FIG. 3, in a ¼ speed output, the firing cycle may be made up of 24 firing windows, each comprising 60 electrical degrees. For example, in firing windows 2 and 3, switches AAF and BBR are fired for a first cycle skipper; in firing windows 6 and 7 switches BBF and CCR are fired for a second cycle skipper; in firing windows 10 and 11, switches CCF and AAR are fired for the first cycle skipper; in firing windows 14 and 15 switches AAF and BBR are fired for the second cycle skipper; and in firing windows 22 and 23 switches CCF and AAR are fired for the first cycle skipper. The foregoing firing sequence is repeated for subsequent firing cycles.

It will be appreciated that the firing windows for the first and second cycle skippers are not concurrent. More particularly, such firing windows are configured to exhibit a phase angle shift with respect to one another (e.g., non-concurrent firings), and this phase shifting between the firing patterns applied to the first and second cycle-skippers enables to advantageously reduce the magnitude of the harmonic components. The foregoing example is extended below to four cycle-skippers.

FIG. 4 indicates an example family of firing signals for up to four cycle skippers, as the one cycle skipper shown in FIG. 2, and represents an example of ¼ speed, forward motor rotation, wherein positive portions of the input signal waveforms are utilized. For example, the column labeled CS1 represents the firing signals applied to the power switches of a first cycle skipper. (Note that column CS1 contains the same firing sequence described above in the context of FIG. 3 for the first cycle skipper). The column labeled CS2 represents the firing signal applied to the power switches of a second cycle skipper. (Note that column CS2 contains the same firing sequence described above in the context of FIG. 3 for the second cycle skipper). It will thus be appreciated that the left half of FIG. 4, (firing signals for CS1 and CS2) essentially conveys the same information depicted in FIG. 3.

The column labeled SOURCE/LOAD indicates phase interconnections between the source and the load, which are enabled by the specific switches indicated as being fired during a given firing window. For example, when switches AAF and BBR are fired, the column labeled SOURCE/LOAD lists Vab⇒Vab. This indicates that the firing of switches AAF and BBR enables an interconnection of source phases A and B to load phases A and B. Similarly, when switches BBF and CCR are fired, the column labeled SOURCE/LOAD lists Vbc⇒Vbc. This indicates that the firing of switches BBF and CCR enable an interconnection of source phases B and C to load phases B and C. The xxxxxx entries indicate that no switches are fired during the corresponding firing windows.

The column labeled CS3 in FIG. 4 represents the firing signals applied to the power switches of a third cycle skipper, and the column labeled CS4 represents the firing signals applied to the power switches of a fourth cycle skipper. Firstly, note that except for the phase angle shifting illustrated between one another, the firing pattern is essentially the same for each of the cycle skippers. Secondly, note that the combination of firing signals for the first and second cycle skippers, and for the third and fourth cycle skippers due to symmetry considerations will give rise to an optimal reduction of harmonics. It will be appreciated, however, that, for example, one could implement other combinations of firing sequences, if optimal reduction of harmonics is not a consideration. For example, in the event of connecting two cycle skippers, one could combine the firing sequence of the first and the third cycle skippers, or, in the alternative, the firing sequences of the second and fourth cycle skippers. Below are additional examples of firing patterns under various operational conditions for cycle skippers comprising the baseline circuit architecture shown in FIG. 2.

FIG. 5 indicates a family of firing signals for up to four cycle skippers, as the one cycle skipper shown in FIG. 2, and represents an example of ¼ speed operation, wherein positive portions of the input signal waveforms are utilized.

FIG. 6 indicates a family of firing signals for up to four cycle skippers, as the one cycle skipper shown in FIG. 2, and represents an example of ¼ speed operation, wherein negative portions of the input signal waveforms are utilized. The foregoing examples correspond to various typical applications of ¼ speed operations, wherein the harmonic reduction is implemented by configuring the firing patterns applied to two or more cycle skippers to have a selected phase angle shifting between one another. Below one will now find examples corresponding to ½ speed operation.

FIG. 7 indicates a family of firing signals for a number of two cycle skippers, as the one cycle skipper shown in FIG. 2, and represents an example of ½ speed single pulse, wherein positive portions of the input signal waveforms are utilized.

FIG. 8 indicates a family of firing signals for a number of two cycle skippers, as the one cycle skipper shown in FIG. 2, and represents an example of ½ speed single pulse, wherein positive portions of the input signal waveforms are utilized.

Thus far one has shown various example embodiments wherein harmonic reductions can be achieved in a motor speed control system for variable speed alternating current (ac) electromotive machines based on providing a pre-defined phase angle shift to the firing signals applied to two or more cycle skippers connected to a common source. That is, such harmonic reductions may be achieved by programming the controller 20 to command the cycle skippers, to shift the firing patterns and achieve a desired phase shifting. These embodiments may be particularly attractive for applications involving field-deployed hardware since in this aspect of the invention one need not reconfigure such field-deployed hardware (e.g., pre-existing hardware). For example, presuming that the field-deployed hardware comprises the baseline circuit architecture illustrated in FIG. 2, one can achieve the benefits of the present invention by reconfiguring the software in the controller 20 and in the cycle skippers, without affecting the pre-existing hardware.

The inventors of the present invention have further recognized that aspects of the present invention need not be limited to the baseline circuit architecture illustrated in FIG. 2. By way of background explanation, it is noted that the circuit architecture illustrated in FIG. 2 makes use of fourteen power switches for implementing a given set of phase interconnections between source and load. It will be appreciated, however, that an architecture that uses fourteen power switches for implementing these phase interconnections between source and load, just comprises a subset of the full set of interconnections that in a general case can be implemented with a cycle converter that uses a full complement of power switches (e.g., eighteen power switches). That is, the present inventors have innovatively recognized that the baseline architecture shown in FIG. 2 may be adapted to capture phase interconnections not available to the baseline configuration. Thus, presuming that the circuit architecture of the cycle skippers to be used comprises a subset (e.g., less than 18 power switches) of the power switches typically available in a full cycle converter, then alternative circuit architectures may be provided that conceptually can equally benefit from aspects of the present invention. It is believed that in practice using alternative circuit architectures (e.g., different hardware configurations) may not be as readily attractive as the simplicity of just reconfiguring the controller software since this aspect would require developing and maintaining different hardware configurations.

Figure 9:
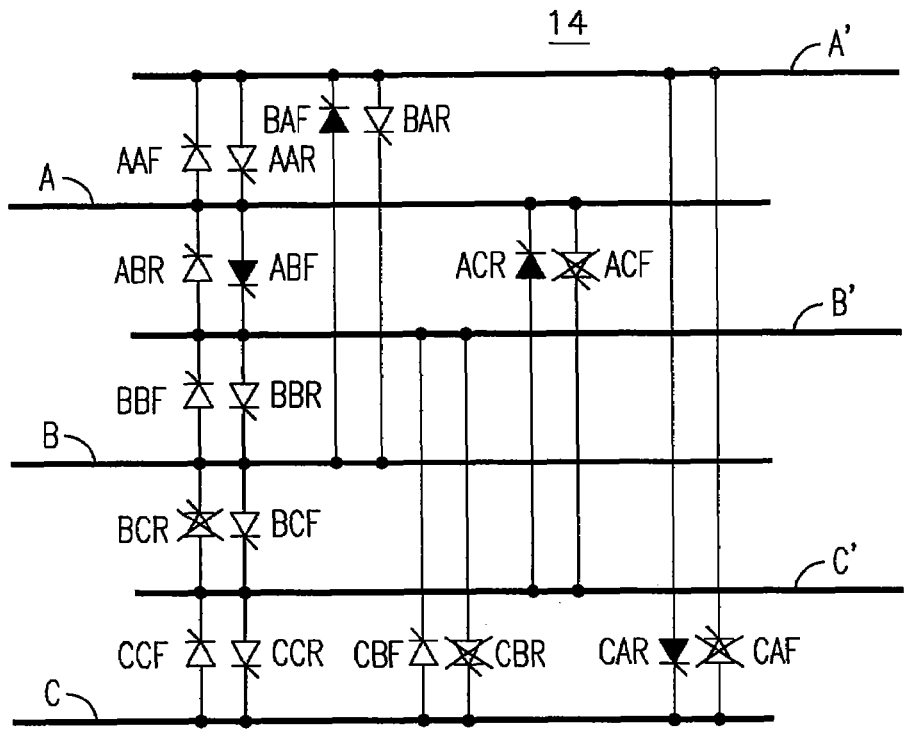
FIG. 9 illustrates one example of hardware modifications made to the baseline circuit architecture of FIG. 2.

FIG. 9 illustrates a first example variation with respect to the baseline circuit architecture illustrated in FIG. 2. More particularly, the power switches drawn in solid represent switches added, and power switches drawn with a cross-over line represent power switches deleted.

FIG. 10 indicates a family of firing signals for up to four cycle skippers, as the one cycle skipper shown in FIG. 9, and represents an example of ¼ speed, wherein positive portions of the input signal waveforms are utilized to, for example, achieve CBA output phase rotation with CBA input phase rotation.

FIG. 11 indicates a family of firing signals for up to four cycle skippers, as the one cycle skipper shown in FIG. 9, and represents an example of ¼ speed operation, wherein positive portions of the input signal waveforms are utilized to, for example, achieve CBA output phase rotation with CBA input phase rotation.

FIG. 12 indicates a family of firing signals for a total number of four cycle skippers, as the one cycle skipper shown in FIG. 9, and represents an example of ¼ speed operation, wherein negative portions of the input signal waveforms are utilized to, for example, achieve CBA output phase rotation with CBA input phase rotation. The foregoing examples correspond to various typical applications of ¼ speed operations, wherein the harmonic reduction is implemented by configuring the firing patterns applied to two or more cycle skippers, to have a selected phase angle shifting between one another. Below one will now find examples corresponding to ½ speed operation.

FIG. 13 indicates a family of firing signals for a number of two cycle skippers, as the one cycle skipper shown in FIG. 9, and represents an example of ½ speed, single pulse, wherein negative portions of the input signal waveforms are utilized to, for example, achieve CBA output phase rotation with CBA input phase rotation.

FIG. 14 indicates a family of firing signals for a number of two cycle skippers, as the one cycle skipper shown in FIG. 9, and represents an example of ½ speed, single pulse, wherein positive portions of the input signal waveforms are utilized.

Figure 15:
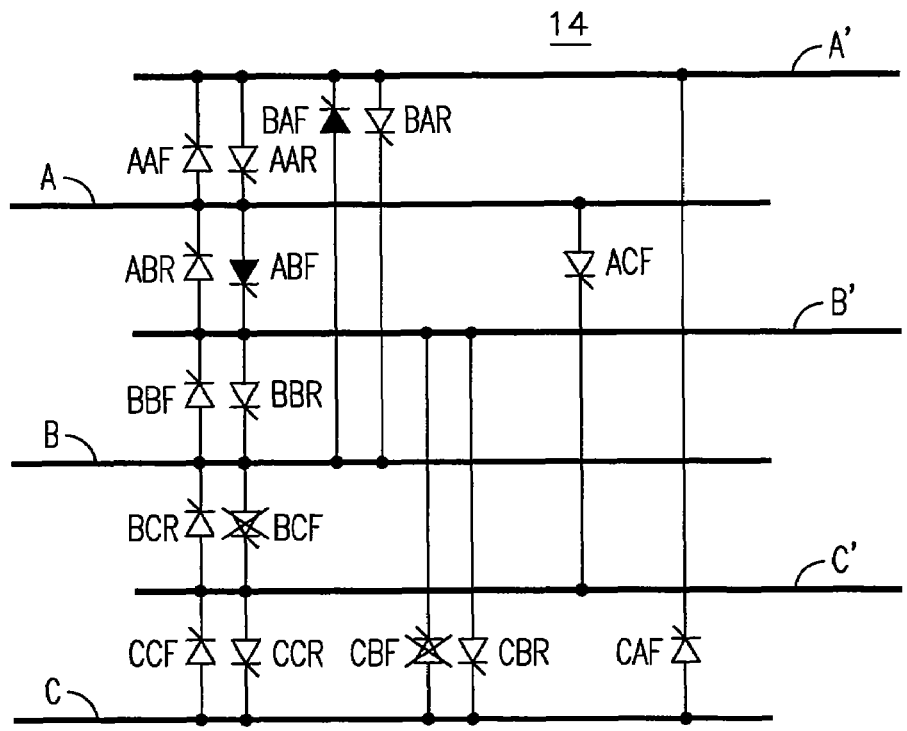
FIG. 15 illustrates another example of hardware modifications made to the baseline circuit architecture of FIG. 2.

FIG. 15 illustrates a second example variation with respect to the baseline circuit architecture illustrated in FIG. 2. Again, the power switches drawn in solid represent power switches which have been added and power switches drawn with a cross-over line represent power switches which have been deleted.

FIG. 16 indicates a family of firing signals for a total of up to four cycle skippers, as the one cycle skipper shown in FIG. 15, and represents an example of ¼ speed operations, wherein positive portions of the input signal waveforms are utilized to, for example, achieve ABC output phase rotation with CBA input phase rotation.

FIG. 17 indicates a family of firing signals for a total number of two cycle skippers, as the one cycle skipper shown in FIG. 15, and represents an example of ½ speed, double-pulse operation, wherein positive portions of the input signal waveforms are utilized to, for example, achieve CBA output phase rotation with CBA input phase rotation.

Figure 18:
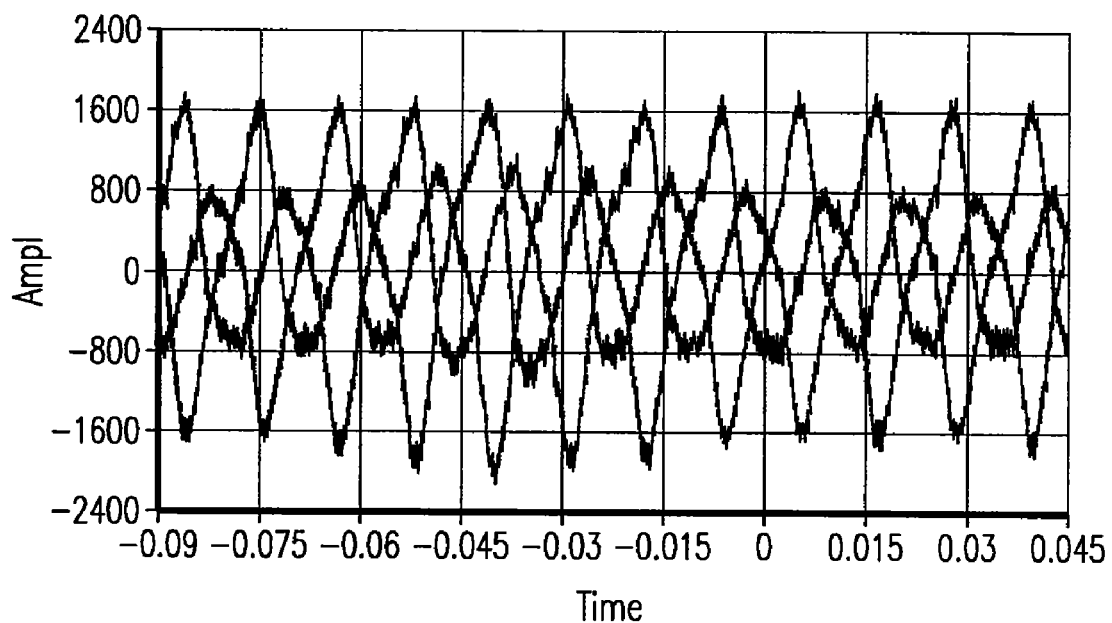
FIGS. 18–21 respectively show comparative plots of load current for a cycle skipping system with two cycle skippers controlled with phase angle shifting techniques (e.g., non-concurrent firings) embodying aspects of the present invention (FIGS. 19 and 21) versus a cycle skipping system with cycle skippers controlled with conventional firing techniques (concurrent firings) (FIGS. 18 and 20).
Figure 19:
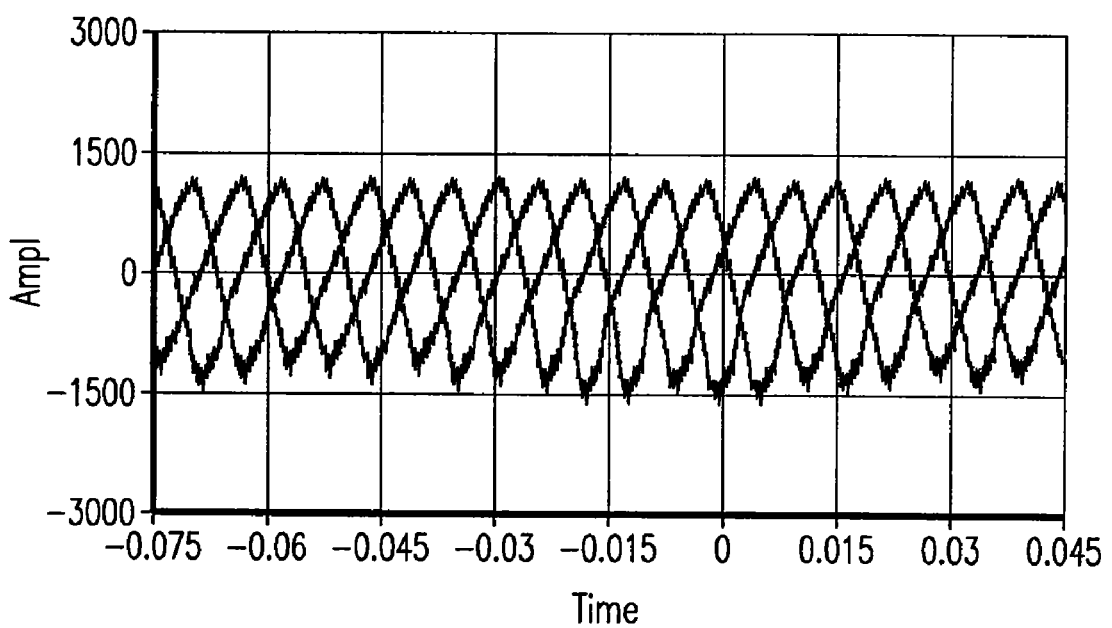

FIG. 18 is a plot of load phase currents for two radiator fans driven by cycle skippers controlled using traditional control techniques (no phase angle shift) to provide ½ speed, single pulse operation. Compare the harmonic reduction shown in FIG. 19, which is a plot of load phase currents for two radiator fans driven by cycle skippers controlled using control techniques embodying aspects of the present invention (non-concurrent firings) to provide ½ speed, single pulse operation.

Figure 20:
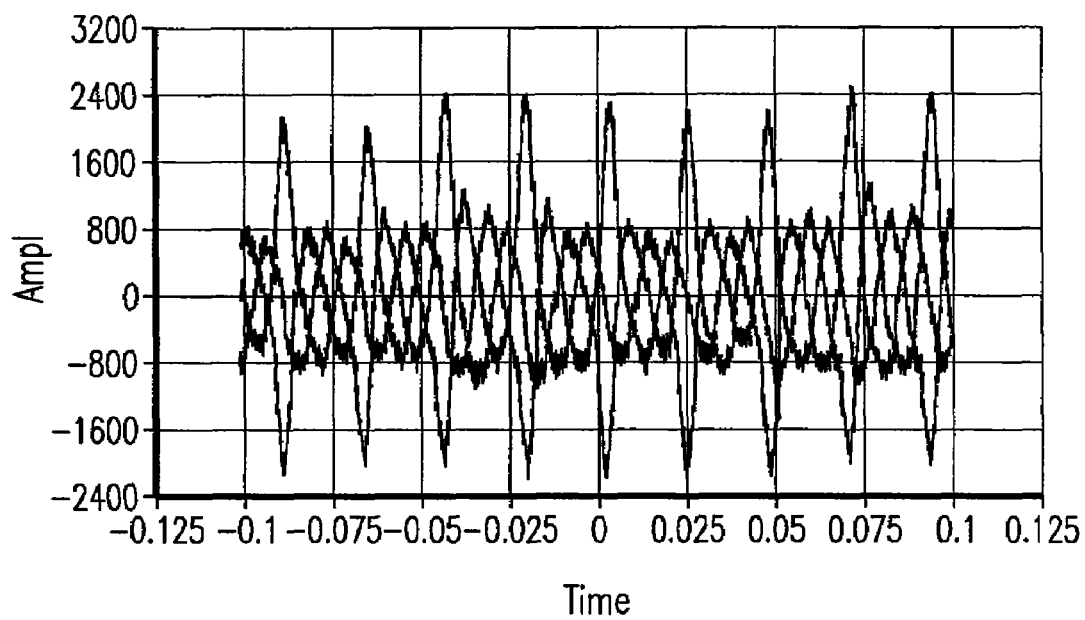
Figure 21:
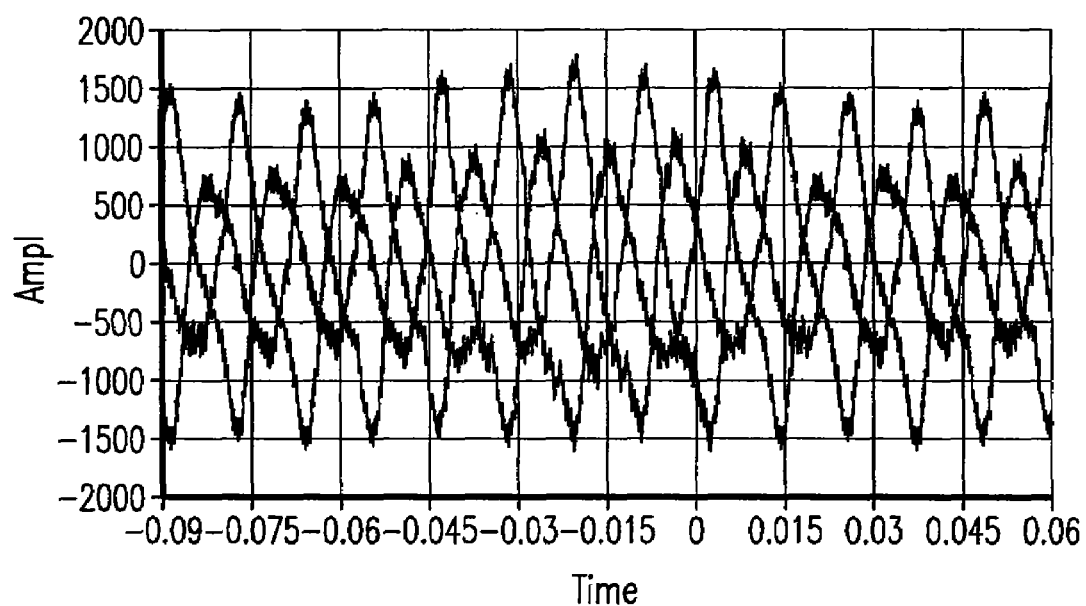

FIG. 20 is a plot of load phase currents for two radiator fans driven by cycle skippers controlled using traditional control techniques (no phase angle shift) to provide ¼ speed operation. Compare the harmonic reduction shown in FIG. 21, which is a plot of load phase currents for two radiator fans driven by cycle skippers controlled using control techniques embodying aspects of the present invention (non-concurrent firings) to provide ¼ speed.

It will be appreciated that establishing and maintaining a firing synchronization between two or more cycle skippers embodying aspects of the present invention is desirable since this ensures that no concurrent firings will occur for such cycle skippers. For example, it may be desirable to ensure that a first cycle skipper is synchronized relative to a given timing reference frame, e.g., this first cycle skipper may be synchronized to have a firing sequence that starts at a given phase angle, such as a zero phase angle. Similarly, it may be desirable to ensure that a second cycle skipper is also synchronized relative to the same reference frame, and hence synchronized relative to the first cycle skipper, e.g., this second cycle skipper may be synchronized to have a firing sequence which is shifted by 180 degrees with respect to the firing sequence of the first cycle skipper. It will be appreciated that the firing synchronization between two or more cycle skippers can be achieved in a variety of ways.

Below is a listing of various example techniques that may be used for achieving the firing synchronization.

Single hard-wired common synchronization signal for all cycle skippers, e.g., one master and n slaves Software-based synchronization by command from supervisory controller or master/slave configuration, such as may be implemented by monitoring source voltage and/or currents Software-based synchronization by command from supervisory controller or master/slave configuration, such as may be implemented by monitoring source voltage and/or cycle-skippers firing states Software-based synchronization by command from supervisory controller, or master/slave configuration, such as may be implemented by monitoring source voltage frequency variation, zero crossings, phase angle variation, or combinations of the foregoing parameters Software-based synchronization by command from supervisory controller, or master/slave configuration, such as may be implemented by monitoring generator shaft RPM.

Software-based synchronization by command from supervisory controller, or master/slave configuration, such as may be implemented by monitoring generator excitation (e.g., percent of firing angle)

Software-based synchronization by command from supervisory controller, or master/slave configuration, such as may be implemented by monitoring generator shaft position.

Software-based self-synchronization, e.g., master/slave configuration, such as may be implemented by monitoring source voltage zero crossings Software-based self-synchronization e.g., master/slave configuration, such as may be implemented by monitoring source voltage frequency Software-based self-synchronization e.g., master/slave configuration, such as may be implemented by monitoring load currents Arbitrary timing phase-shift based on supervisory controller, or master/slave configuration, as may be commanded via a communications link Arbitrary timing phase-shift based on supervisory controller, or master clock pulse Aspects of the present invention can be embodied in the form of computer-implemented processes and apparatus for practicing those processes. The present invention can also be embodied in the form of computer program code including computer-readable instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. When implemented on a computer, the computer program code segments configure the computer to create specific logic circuits or processing modules.

While the preferred embodiments of the present invention have been shown and described herein, it will be obvious that such embodiments are provided by way of example only. Numerous variations, changes and substitutions will occur to those of skill in the art without departing from the invention herein. For example, although example embodiments have been described in the context of a three phase system, it will be understood that aspects of the present invention can be similarly incorporated for single or any multi phase system. Accordingly, it is intended that the invention be limited only by the spirit and scope of the appended claims.

We claim as our invention:

1. A method for configuring a cycle-skipping control system comprising two or more cycle skippers connected to a common multi-phase AC (alternating current) power source to drive a variable frequency load, said method comprising:
    defining a baseline circuit architecture for the cycle skippers, said baseline circuit architecture enabling a first set of interconnections when connected between the phases of the power source and the phases of the load;
    providing one or more modified circuit architectures relative to the baseline circuit architecture, wherein a modified circuit architecture enables a second set of interconnections when connected between the phases of the power source and the load phases, the second set of interconnections comprising at least some interconnections not enabled by the baseline circuit architecture;
    selecting a desired mode of operation for a cycle-skipping control system having two or more cycle skippers with a modified circuit architecture; and
    generating a respective firing sequence to be applied to a plurality of power switches in the two or more cycle skippers with a modified circuit architecture for implementing the desired mode of operation.

2. The method of claim 1 wherein each respective firing sequence is configured to provide a predefined phase angle shift between one another, wherein the phase angle shift enables a non-concurrent firing for each cycle skipper over a firing cycle.

3. The method of claim 1 wherein said phase angle shift is symmetrically distributed over the firing cycle, thereby optimally reducing harmonic components in currents supplied by the common power source.

4. The method of claim 1 wherein said phase angle shift is asymmetrically distributed over the firing cycle, thereby reducing harmonic components in currents supplied by the common power source.

5. The method of claim 1 wherein the selecting of said mode of operation comprises selecting a fraction 1/N of an input frequency source to be supplied at one or more output terminals by the cycle-skipping control system, where N is a predetermined integer.

6. The method of claim 1 wherein the selecting of said mode of operation comprises selecting at least one of the following: a first phase sequence, and a second phase sequence, wherein the second phase sequence comprises a sequence reversal with respect to the first phase sequence.

7. The method of claim 1 wherein the selecting of said mode of operation comprises selecting at least one of the following: a positive portion of an input source voltage and a negative portion of the input source voltage.

8. An article of manufacture comprising a computer program product comprising a computer-usable medium having a computer-readable code therein for configuring a cycle-skipping control system comprising two or more cycle skippers connected to a common multi-phase AC (alternating current) power source to drive a variable frequency load, said computer-readable code comprising:
    computer-readable code for defining a baseline circuit architecture for the cycle skippers, said baseline circuit architecture enabling a first set of interconnections when connected between the phases of the power source and the load phases;
    computer-readable code for modifying the baseline circuit architecture to provide one or more modified circuit architectures, wherein a modified circuit architecture enables a second set of interconnections when connected between the phases of the power source and the load phases, the second set of interconnections comprising at least some interconnections not present in the baseline circuit architecture;
    computer-readable code for selecting a desired mode of operation for a cycle-skipping control system having two or more cycle skippers with a modified circuit architecture; and
    computer-readable code for generating a respective firing sequence to be applied to a plurality of power switches in the two or more cycle skippers with a modified circuit architecture for implementing the desired mode of operation.

9. The article of manufacture of claim 8 further comprising computer-readable code for providing a predefined phase angle shift between each respective firing sequence to be applied to the two or more cycle skippers over a firing cycle, wherein said phase angle shift enables a non-concurrent firing for each cycle skipper over the firing cycle.

10. The article of manufacture of claim 8 wherein said phase angle shift is symmetrically distributed over the firing cycle, thereby optimally reducing harmonic components in currents supplied by the common power source.

11. The article of manufacture of claim 8 wherein said phase angle shift is asymmetrically distributed over the firing cycle, thereby reducing harmonic components in currents supplied by the common power source.

12. The article of manufacture of claim 8 wherein the computer-readable code for selecting the mode of operation comprises code for selecting a fraction 1/N of an input frequency source to be supplied at one or more output terminals by the cycle-skipping control system, where N is a predetermined integer.

13. The article of manufacture of claim 8 wherein the computer-readable code for selecting the mode of operation comprises code for selecting at least one of the following: a first phase sequence, and a second phase sequence, wherein the second phase sequence comprises a sequence reversal with respect to the first phase sequence.

14. The article of manufacture of claim 8 wherein the computer-readable code for selecting the mode of operation comprises code for selecting at least one of the following: a positive portion of an input source voltage and a negative portion of the input source voltage.

15. A controller for a cycle-skipping control system comprising two or more cycle skippers connected to a common multi-phase AC (alternating current) power source to drive a variable frequency load, said controller comprising:
    a circuit architecture for a respective plurality of power switches in the cycle skippers, wherein said circuit architecture is based on modifications made to a baseline architecture configured to provide a first set of interconnections when connected between the phases of the power source and the load phases, and further wherein a modified circuit architecture is configured to enable a second set of interconnections when connected between the phases of the power source and the load phases, the second set of interconnections comprising at least some interconnections not enabled by the baseline circuit architecture;
    a mode selector for selecting a desired mode of operation for a cycle-skipping control system having two or more cycle skippers with a modified circuit architecture;
    a firing sequence generator configured to generate a respective firing sequence to be applied to a plurality of power switches in the two or more cycle skippers for implementing the desired mode of operation; and a phase angle shifter for providing a predefined phase angle shift between each respective firing sequence to be applied to the two or more cycle skippers over a firing cycle, wherein said phase angle shift enables a non-concurrent firing for each cycle skipper over the firing cycle.

16. The controller of claim 15 wherein the power source comprises a three-phase power source.

17. The controller of claim 15 wherein the variable frequency load comprises one or more induction motors.

18. The controller of claim 15 wherein the power source comprises a three-phase locomotive power source and the variable frequency load comprises one or more induction motors onboard the locomotive.

19. The controller of claim 15 wherein said phase angle shift is symmetrically distributed over the firing cycle, thereby optimally reducing harmonic components in currents supplied by the common power source.

20. The controller of claim 15 wherein said phase angle shift is asymmetrically distributed over the firing cycle, thereby reducing harmonic components in currents supplied by the common power source.

21. The controller of claim 15 wherein the phase shifter is responsive to a common synchronization signal for the cycle skippers.

22. The controller of claim 15 wherein the phase shifter is responsive to at least one of the following: a monitored parameter of source voltages, a monitored parameter of source currents, a monitored parameter of load currents, a monitored parameter of the power source, a parameter indicative of a cycle skipper firing state and a combination of the foregoing.

23. The controller of claim 22 wherein the monitored parameter of source voltages and currents comprises at least one of the following parameters: frequency variation, zero crossings, phase angle variation, and a combination of the foregoing parameters.

24. The controller of claim 22 wherein the power source comprises an alternator and the monitored parameter of the power source comprises at least one of the following parameters: alternator shaft speed, alternator shaft position and a combination of the foregoing parameters.

* * * * *